United States Patent [19]
Smith

[11] 3,840,085
[45] Oct. 8, 1974

[54] MOTORCYCLE-DRAWN CHARIOT

[76] Inventor: Sidney Smith, 111 E. Washington, Chandler, Ind. 47610

[22] Filed: June 8, 1972

[21] Appl. No.: 261,044

[52] U.S. Cl............ 180/14 R, 180/77 R, 280/204
[51] Int. Cl.......................................... B62k 27/00
[58] Field of Search ..... 180/14 R, 11, 12, 13, 77 H, 180/77 HT, 77 R, 77 S; 280/204, 111, 112, 202, 203, 205, 204, 1.16, 1.165, 7.16, 292, 419, 492

[56] References Cited
UNITED STATES PATENTS
| | | | |
|---|---|---|---|
| 2,032,657 | 3/1936 | Frederickson | 280/111 |
| 2,303,653 | 12/1942 | Mitchell | 280/112 R |

FOREIGN PATENTS OR APPLICATIONS
| | | | |
|---|---|---|---|
| 40,192 | 1956 | Poland | 280/204 |
| 910,244 | 5/1946 | France | 180/12 |
| 643,206 | 1962 | Italy | 280/111 |
| 556,451 | 10/1943 | Great Britain | 180/77 R |
| 40,444 | 6/1932 | France | 280/111 |
| 432,783 | 3/1948 | Italy | 280/204 |

*Primary Examiner*—Robert B. Reeves
*Assistant Examiner*—David A. Scherbel
*Attorney, Agent, or Firm*—Brumbaugh, Graves, Donohue & Raymond

[57] ABSTRACT

A chariot-type vehicle adapted to be drawn by a motorcycle. The vehicle comprises a chassis supporting a wheel on either side, and a chariot "basket" pivoted on the chassis both front and rear about a longitudinal central axis. The vehicle further includes a drawbar for attaching the basket to the motorcycle as well as means for controlling the steering and speed of the motorcycle from the basket. A vehicle driver can therefore operate the controls of the motorcycle while standing in the basket and can cause the motorcycle to lean through corners by shifting his weight.

23 Claims, 10 Drawing Figures

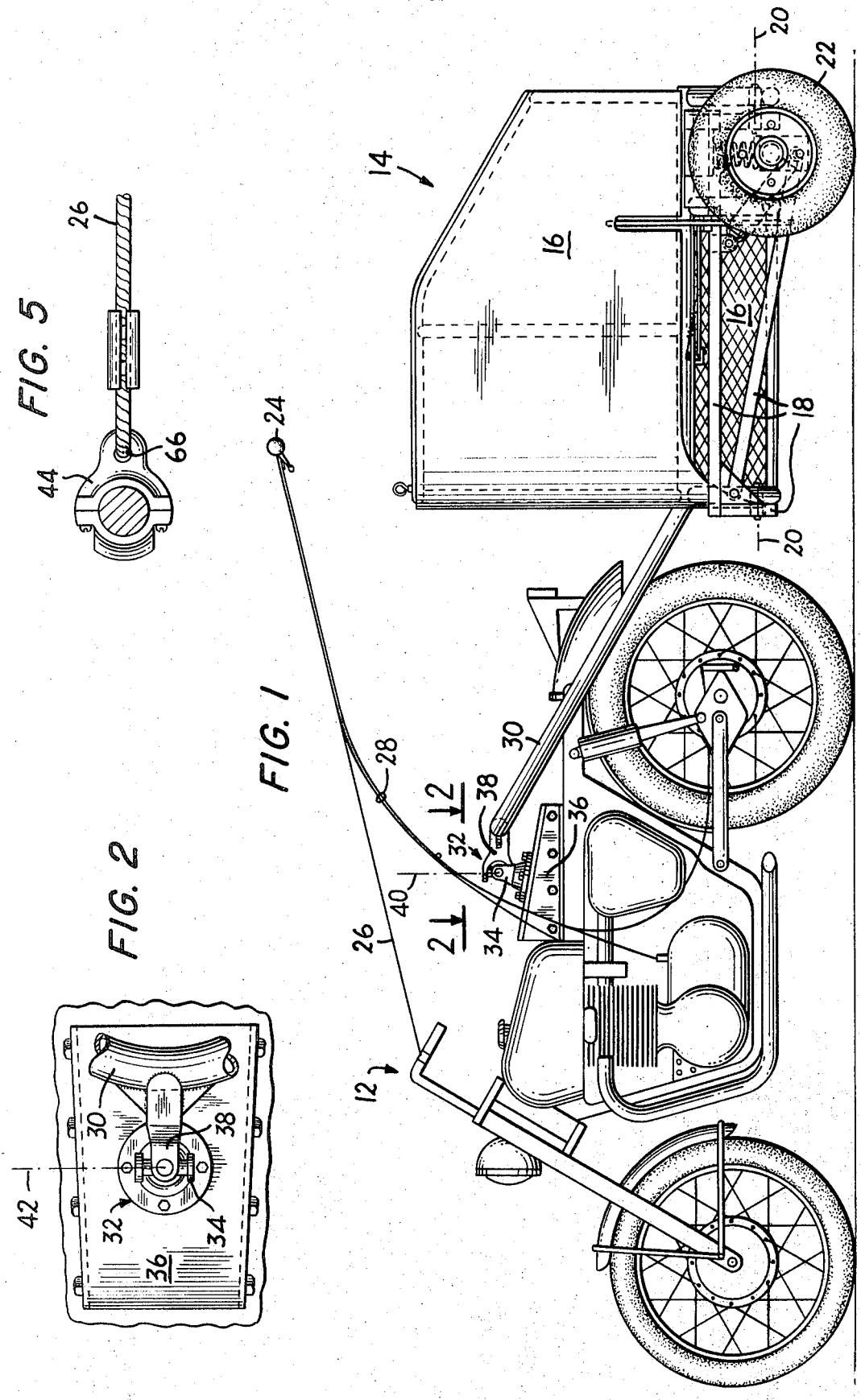

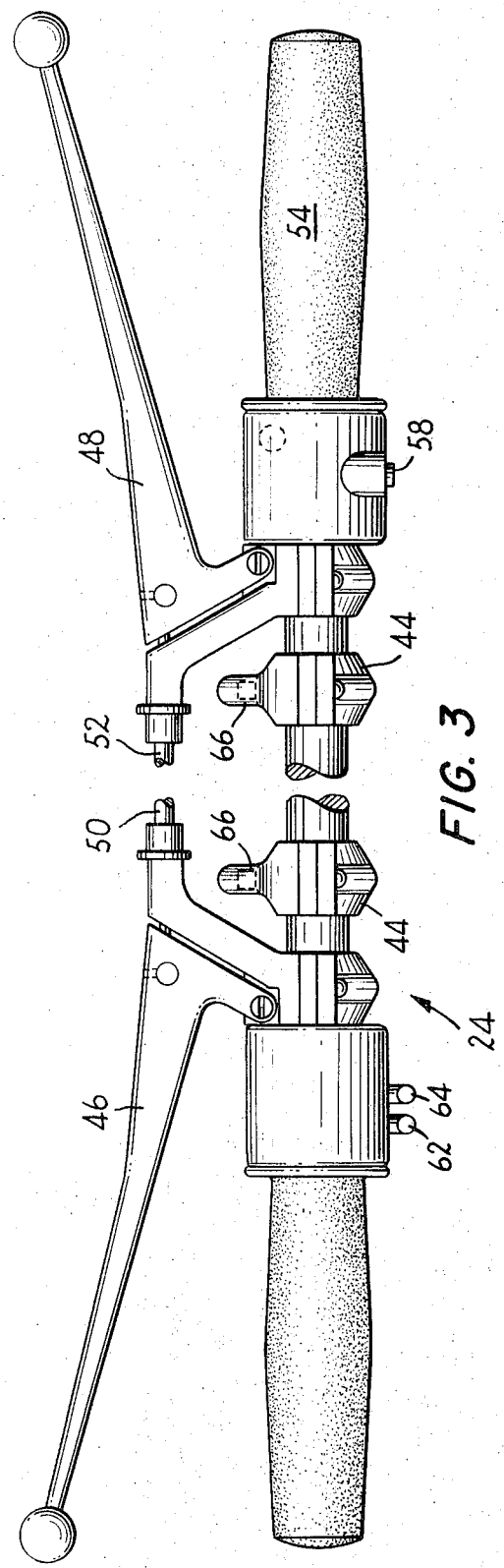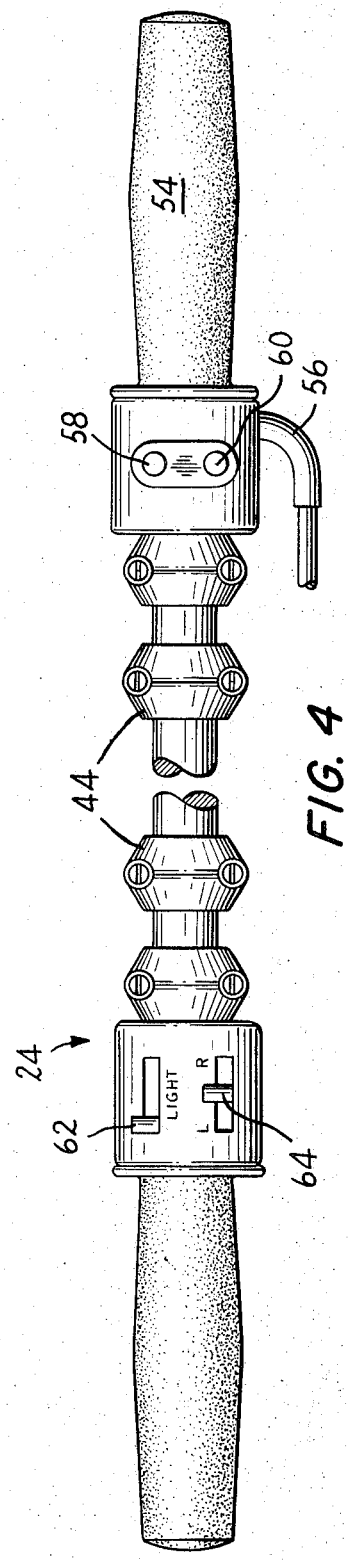

PATENTED OCT 8 1974 3,840,085

MOTORCYCLE-DRAWN CHARIOT

BACKGROUND OF THE INVENTION

The present invention relates to a chariot-type vehicle adapted to be drawn by a motorcycle.

Hore-drawn chariots were used in ancient times in battle, in processions and in races to carry a driver in a convenient posture behind a single horse or team of horses. Historically, a chariot was a light, two-wheeled, relatively narrow vehicle having one or more poles extending forward for attachment to the horse yokes. The chariot was provided with a platform for one or more riders to stand and usually included a rail or rails arranged about belt-height for the riders to hold while the chariot was in motion.

The chariot was conventionally designed to permit the driver to stand, giving him maximum freedom and flexibility of motion. Today, the equivalent horse-drawn two-wheeled vehicle, the sulky, provides a seat for the driver to achieve minimum wind resistance during races.

As is well known, chariot racing was extremely popular in ancient times, as is harness racing today. In both of these sports the driver is required to control the horse remotely through the use of reins. Although a rider mounted in a horse's back may achieve greater speed, the control of the horse from a light, two-wheeled vehicle adds complexity and lends excitement to the sport for the driver as well as the spectator.

SUMMARY OF THE INVENTION

It is a principal object of the present invention to provide a chariot-type vehicle which may be attached to, and powered by a motorcycle.

More particularly, it is an object of the present invention to provide a chariot-type vehicle for attachment to a motorcycle which permits the speed, steering and "lean" of the motorcycle to be controlled from the vehicle.

The term "motorcycle" as used herein, is intended to include all motored two-wheeled vehicles such as motor bikes, mopeds, motor scooters and the like in addition to the more conventional motorcycles which are used on the open road and in racing. All of these motored two-wheeled vehicles have the common characteristic of requiring the driver to maintain vehicle balance. Steering a motorcycle is accomplished through vehicle "lean" by shifting the driver's weight and bu turning the front wheel to establish a new position of balance between gravity and centrifugal force. It is primarily this requirement of balance which gives motorcycle racing its unique quality and popularity as a sport.

The above-mentioned object, as well as other objects which will become apparent in the discussion that folows, are achieved, according to the present invention, by providing a chariot-type vehicle comprising essentially two parts: (1) a chassis having a frame, axle and two road wheels and (2) a driver platform or "basket" pivotally connected to the chassis about a longitudinal central axis. When the chariot basket is attached to the frame of a motorcycle, a shift of weight on the basket by the driver will cause the motorcycle to lean.

More specifically, the chariot-type vehicle according to the present invention is provided with (1) a chassis having a frame and a wheel mounted on either side thereof; (2) a basket arranged on the chassis and pivotally connected to the chassis frame on a common central axis; and (3) means, such as a handlebar, adapted for connection to the motor cycle for controlling the steering and speed of the motorcycle from the basket. In addition, the basket is provided with a drawbar extending forward to the motorcycle to permit attachment of the basket to the motorcycle.

According to a particular feature of the present invention, the common central axis about which the basket is pivoted is arranged on a horizontal plane transverse to, and at approximately the same elevation as the wheel axle. The drawbar is constructed to attach the basket to the frame of the motorcycle at a point which lies in a vertical plane passing through the common central axis.

The drawbar is connected to the motorcycle at the position of, or near the motorcycle seat in order to maintain the proper weight distribution on the motorcycle. The connection is made by a universal joint which permits angular movement of the chariot-type vehicle with respect to the motorcycle about two transverse axes but prevents relative rotation about the central longitudinal axis of the joint. This arrangement permits the vehicle to follow the motorcycle around corners and to ride over bumps in the road independently of the motorcycle without impairing the ability of the driver to lean the motorcycle by shifting his or her weight in the basket.

Accordingly to another feature of the present invention, the chariot-type vehicle is provided with a device for selectively preventing pivotal motion of the basket with respect to the chassis. Preferably, this device includes a two-way ratchet mounted on the chassis and a ratchet pawl pivotally connected to the basket. The pawl is spring-biased toward the teeth of the ratchet to latch the basket to the chassis and prevent lean when the motorcycle is at a standstill. Means are provided to selectively withdraw the pawl from the ratchet to permit the basket and motorcycle to lean when desired.

According to still another feature of the present invention, the chassis frame is suspended on the wheel axle by a spring suspension system to reduce road vibration in the basket. This suspension system is preferably comprised of springs, shock absorbers, and a sway-bar connected between the chassis frame and the axle.

According to a still further feature of the present invention, the means for controlling the steering and speed of the motorcycle includes a free handlebar or "freebar" arranged to be held and supported by the vehicle driver. This freebar is connected to the handlebars of the motorcycle by a pair of flexible cables or "resins" so that the driver may steer the motorcycle by steering the freebar. In addition, further connecting cables and the like may be provided between the freebar and the motorcycle for control of the motorcycle throttle, brake, clutch and gear shift mechanism.

BRIEF DESCRIPTION OF THE DRAWINGS

FIG. 1 is a side elevational view of a motorcycle and a chariot-type vehicle according to the preferred embodiment of the present invention.

FIG. 2 is a top view of a universal joint connecting the motorcycle with the chariot-type vehicle of FIG. 1, as seen from the line 2—2 in FIG. 1.

FIG. 3 is a top view of the free handlebar employed with the chariot-type vehicle of FIG. 1.

FIG. 4 is a side elevational view of the free handlebar of FIG. 3.

FIG. 5 is an end view of the clamp arrangement used to attach a steering cable to the handlebar of FIGS. 3 and 4.

DESCRIPTION OF THE PREFERRED EMBODIMENT

Figure 6:
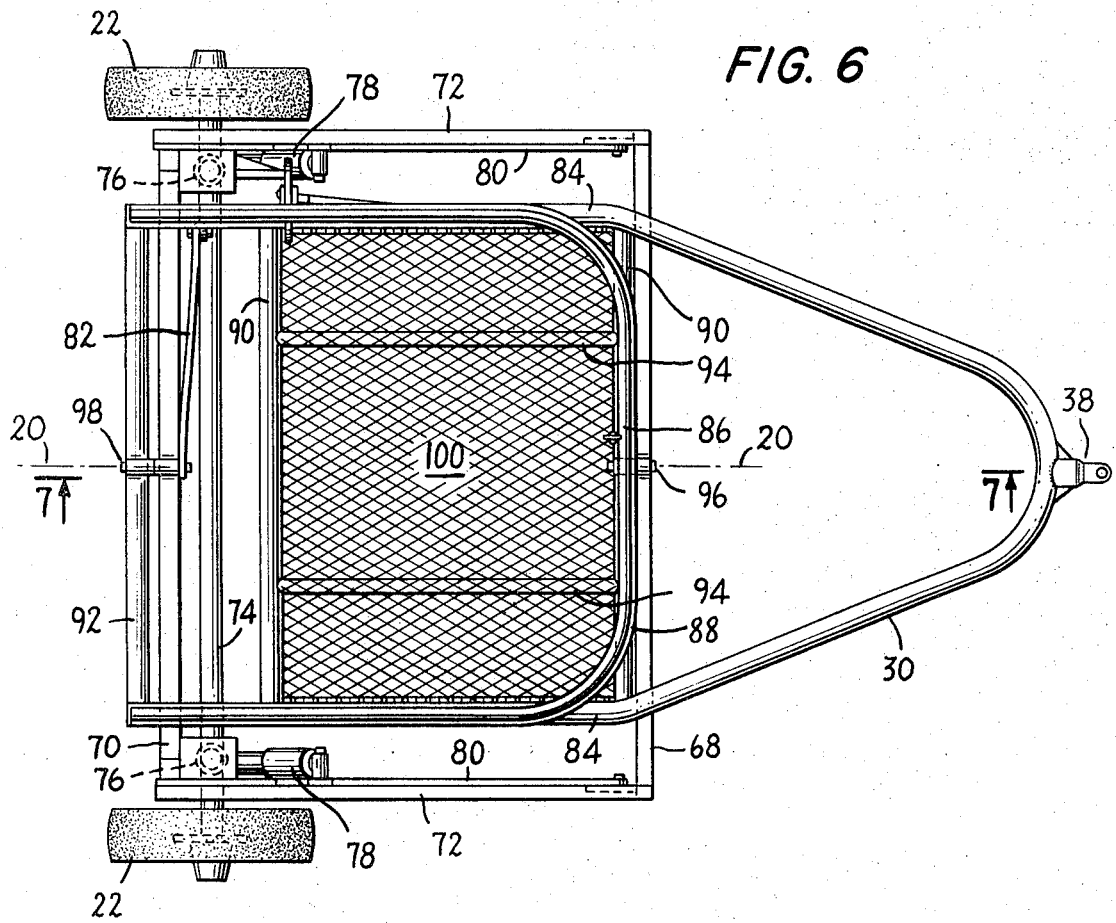
FIG. 6 is a top view of the chariot-type vehicle of FIG. 1.

The preferred embodiment of the present invention will now be described in connection with FIGS. 1-10 of the drawings. Identical elements shown in these various figures are identified with the same reference numerals.

The preferred embodiment of the chariot-type vehicle is shown in FIG. 1 attached to a motorcycle 12. The chariot vehicle, indicated generally at 14, comprises essentially a basket part 16 pivoted fore and aft on a chassis part 18 for sideways movement about a common axis 20. The chassis 28 includes a frame constructed of tubular stock suspended on a pair of wheels 22. The motorcycle 12 is controlled by a person standing or otherwise situated in the basket 16 by means of a free handlebar or "freebar" 24. The freebar is connected to the motorcycle handlebars by a pair of flexible cables or reins 26, and to the motorcycle throttle, brake, clutch and gear shift mechanism by cables 28.

The chariot vehicle is connected to the motorcycle by a drawbar 30 which is attached to the frame of the motorcycle at the seat position by a universal joint 32. The drawbar 30 extends rearward on either side of the rear wheel of the motorcycle and forms part of the frame of the basket 16.

As may be seen in FIGS. 1 and 2, the universal joint includes a front yoke 34 bolted to the frame of the motorcycle with an intermediate adapter or attachment member 36, and a rear yoke 38 welded to the drawbar 30. Since the front yoke 34 and rear yoke 38 of the universal joint are rigidly attached to their respective members, the motorcycle 12 and the basket 16 will lean together, the motorcycle leaning with respect to its points of contact with the ground and the basket leaning about its pivotal axis 20.

The two yokes 34 and 38 are oriented to permit angular movement about vertical and horizontal axes 40 and 42, respectively. The angular freedom provided about the vertical axis 40 permits the chariot vehicle 14 to follow the motorcycle 12 around a corner, while the angular freedom provided about the horizontal axis 42 permits the chariot vehicle to follow the terrain independently of the vertical movement of the motorcycle.

FIGS. 3 and 4 illustrate the freebar 24 in greater detail. FIG. 5 shows a clamp 44 for connecting the reins 26 to the freebar.

As shown in FIG. 3, the freebar 24 is provided with a clutch handle 46 and a brake handle 48. The clutch and brake handles are connected to the clutch and brake mechanisms of the motorcycle in the conventional manner by sheathed cables 50 and 52, respectively.

The right hand grip 54 of the freebar 24 may be rotated about its longitudinal axis in the conventional manner to actuate the motorcycle throttle. The connection is made to the motorcycle throttle by another sheathed cable 56.

The freebar 24 is also connected to the motorcycle by flexible electrical cables (not shown) to provide electrical control of the gear shift mechanism and the motorcycle lights. The motorcycle may be shifted upward electrically by pressing a button 58 on the right-hand side of the freebar, and may be shifted downward by pressing a button 60. The motorcycle headlight and taillight are controlled by a switch 62 and the signal lights controlled by a switch 64 on the left-hand side of the freebar.

The rein cables 26 which are connected to the motorcycle handlebars are atthaced to the freebar at the right and left-hand sides by clamps 44. As shown in side-view in FIG. 5, each clamp has an eye 66 through which the rein is looped.

Figure 7:
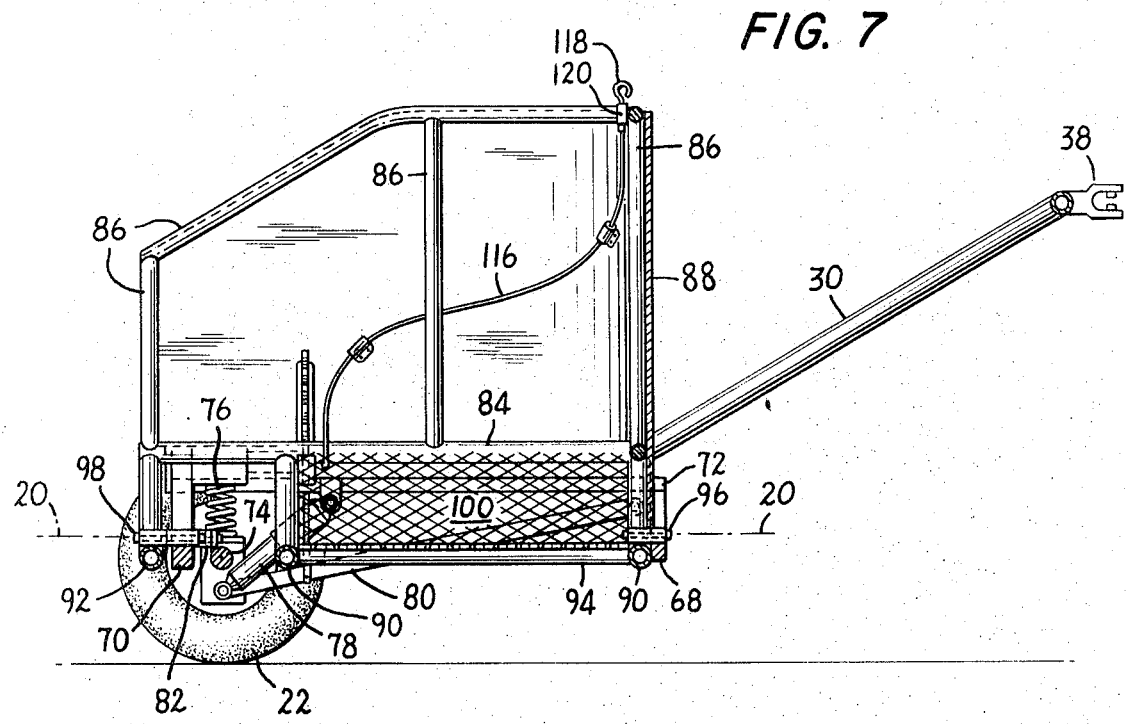
FIG. 7 is a cross-sectional view of the chariot-type vehicle taken along the line 7—7 in FIG. 6.
Figure 8:
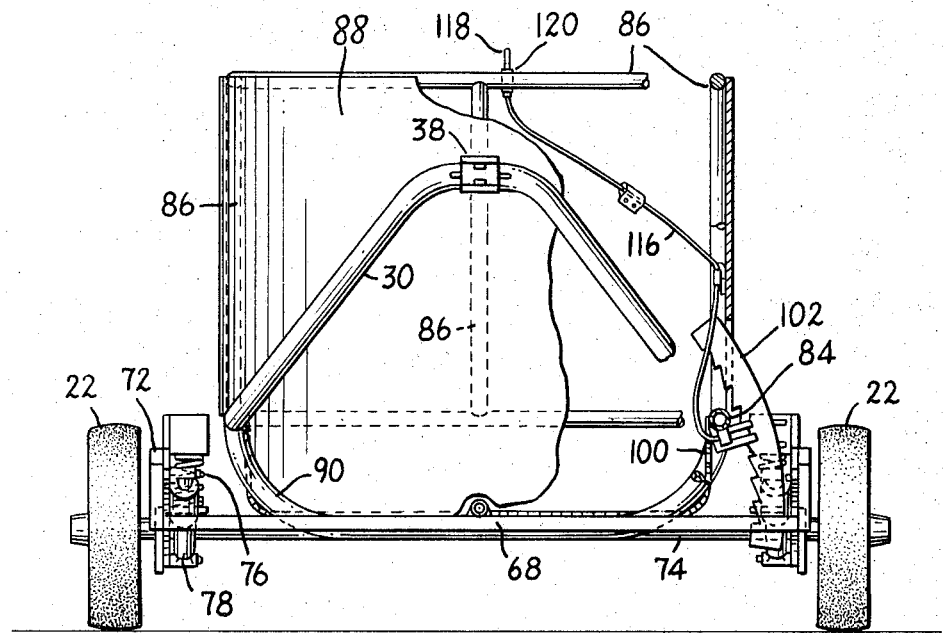
FIG. 8 is a front elevational view, partly cut away, of the chariot-type vehicle of FIG. 1.

FIGS. 6, 7 and 8 illustrate the structure of the chariot vehicle itself. As shown, the vehicle chassis includes a front member 68 and rear member 70 which are rigidly connected by side frame members 72. The unit so constructed is suspended on an axle 74 by springs 76 and shock absorbers 78. A pair of bars 80 extending lengthwise of the vehicle and a transverse sway bar 82 are connected between the axle 74 and the suspended unit of the chassis to hold the axle in position while allowing it to move freely, with respect to the suspended unit, in the vertical direction.

The frame of the vehicle basket is constructed of tubular steel. The drawbar 30 extends rearward on either side of the basket forming the main structural members 84. Steel tubes 86, preferably of slightly smaller diameter than the members 84, extend upward to frame the upper part of the basket. Sheet metal 88 is welded to the outside of this tubular frame, extending downward as far as the members 84.

Two forward steel tubes 90 and a rearward tube 92, preferably of the same diameter as the drawbar members 84, extend downward and connect the members 84 together. The two forward connecting tubes 90 are joined together between the members 84 by a pair of tubes 94. The front tube 90 is pivoted to the front member 68 of the chassis by a pin 96 and the rear tube 92 is pivoted to the rear member 70 of the chassis by a pin 98. The pivot pins 96 and 98 are located along the common axis 20 that extends substantially horizontally through the center of the vehicle. As is best shown in FIGS. 7 and 8, this axis lies slightly above the level of the axle 74. It is desirable to arrange the pivot axis at this low level since the chariot basket must pivot together with the motorcycle which leans sideways about its points of contact with the ground. Ground clearance considerations mitigate against setting the pivot axis much below the level of the axle.

The portion of the basket below the drawbar members 84 and between the lower forward tubes 90 is lined on the inside with expanded metal 100. The expanded metal provides a platform with a non-slip surface on which the vehicle driver may stand. In addition, it allows rainwater to pass through the floor of the vehicle, when the vehicle is parked out of doors.

It should be noted that the upper, supporting surface of the expanded metal platform passes close to the pivot axis 20. It is preferable to arrange the surface supporting the driver's weight at the level of, or even slightly below, the pivot axis to provide lateral stability in the vehicle.

Figure 9:
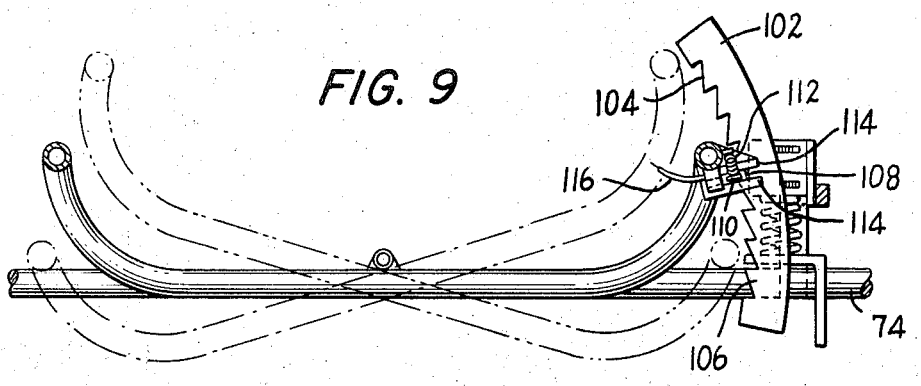
FIG. 9 is a rearward looking view of a portion of the chariot-type vehicle of FIG. 1, showing the two-way ratchet mechanism in detial.
Figure 10:
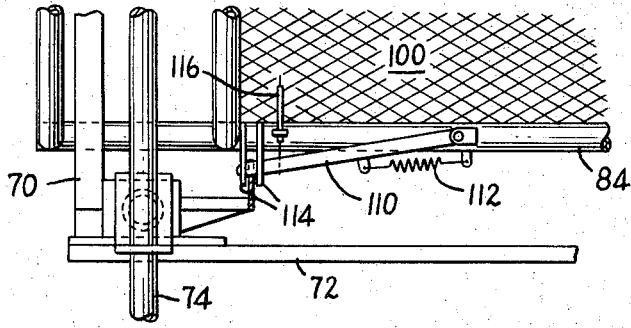
FIG. 10 is an upward looking view of a portion of the chariot-type vehicle of FIG. 1, showing the two-way ratchet mechanism in detail.

FIGS. 8, 9 and 10 illustrate a two-way ratchet mechanism which functions to lock the basket in a horizontal position when the vehicle is at a standstill or not in use. As may be seen, the mechanism includes a ratchet 102 having saw-tooth shaped upper teeth 104 and lower teeth 106 which slant in opposite directions, and a central catch 108. A pawl 110, which is pivoted at its forward end on the adjacent tubular drawbar member 84, is biased toward the ratchet 102 by a spring 112. Guides 114 maintain the pawl 110 in fixed relation to the member 84 while permitting the pawl to pivot toward and away from the teeth 104, 106 and the central catch 108 of the ratchet 102. The pawl may be pulled away from the ratchet against the force of the spring 112 by a sheathed cable 116 which extends upward to a point of convenient access to the vehicle driver. The cable 116 terminates in a knob or a ring 118 which may be lifted to withdraw the pawl from the ratchet. A mechanism 120 is also provided at the end of the cable to lock the pawl in the withdrawn position when desired. The mechanism 120 prevents the ring 118 from being pulled downward by the force of the spring 112 when the ring has been lifted and turned by 90°.

The two-way ratchet mechanism operates to permit the basket to be leaned towards but not away from an even horizontal position. Thus, while the chariot vehicle is being drawn by a motorcycle, the pawl 110 is persumably withdrawn from the ratchet 102 to permit the basket and motorcycle to lean. Each time the vehicle is brought to a standstill, it is necessary to lock the basket and, in turn, the motorcycle in the upright position. This may be done from any position of lean by turning the ring 118 by 90° and allowing it to be withdrawn into the catch mechanism 120. The spring 112 will pull the pawl 110 toward the ratchet 102 against either the upper teeth 104 or lower teeth 106. Thereafter, by shifting of weight, the driver can bring the basket to an upright position and move the pawl in the direction permitted by the teeth into the central catch position 108.

It will be understood that the chariot-type vehicle according to the present invention is susceptible to various changes, modifications, variations, and adaptations as will occur to those skilled in the art. It is therefore intended that the present invention be limited only by the following claims or their equivalents.

I claim:

1. A chariot-type vehicle for attachment to a motorcycle comprising, in combination:
   a. a chassis having a frame and a wheel rotatably mounted on each lateral side thereof;
   b. a basket arranged on said chassis, said basket being pivotally connected to said chassis frame on a common central axis, and having drawbar means for attaching itself to a motorcycle in such a manner that the angle of pivot of said basket about said central axis with respect to the vertical remains substantially equal to the angle of lean of the motorcycle; and
   c. control means, adapted for connection to the motorcycle, for controlling the steering and speed of the motorcycle from said basket.

2. The vehicle defined in claim 1, wherein said common central axis is substantially horizontal.

3. The vehicle defined in claim 1, wherein said common central axis is substantially transverse to the axis of rotation of each of said wheels.

4. The vehicle defined in claim 1, wherein said common central axis lies substantially midway between said two wheels.

5. The vehicle defined in claim 1, wherein said common central axis lies at substantially the same elevation as the axis of rotation of each of said wheels.

6. The vehicle defined in claim 1, wherein said drawbar means is adapted to attach said basket to the frame of the motorcycle at a point which lies in a plane extending substantially vertically through said common central axis.

7. The vehicle defined in claim 1, wherein said drawbar means is adapted to attach said basket to the frame of the motorcycle at a position near motorcycle seat.

8. The vehicle defined in claim 1, further comprising universal joint means arranged between said drawbar means and the motorcycle, permitting angular movement of the drawbar means with respect to the motorcycle about a vertical axis and a horizontal axis that is transverse to said common central axis.

9. The vehicle defined in claim 8, wherein said universal joint is rigidly attached to said drawbar means and to the motorcycle, preventing angular movement of said drawbar means with respect to the motorcycle about a horizontal axis that is parallel to said common central axis.

10. The vehicle defined in claim 1, further comprising means for selectively preventing pivotal motion of said basket with respect to said chassis.

11. The vehicle defined in claim 10, wherein said pivotal motion-preventing means includes a two-way ratchet connected to one of said chassis and said basket; a ratchet pawl connected to the other of said chassis and said basket; means for biasing said pawl toward said ratchet; and means for selectively withdrawing said pawl from said ratchet, whereby said basket may be pivoted into a horizontal position from any position of lean with said pawl biased toward said ratchet and said pawl will maintain said basket in said horizontal position until withdrawn from said ratchet.

12. The vehicle defined in claim 1, wherein said chassis further includes at least one axle supporting said two wheels and spring means suspending said chassis frame on said axle.

13. The vehicle defined in claim 12, further comprising shock absorber means connected between said chassis frame and said axle.

14. The vehicle defined in claim 12, further comprising sway bar means connected between said chassis frame and said axle.

15. The vehicle defined in claim 12, wherein said axle is arranged near the rear portion of said chassis frame.

16. The vehicle defined in claim 1, wherein said control means includes:
 1. a handlebar, adapted to be grasped by a vehicle driver when the driver is in said basket; and
 2. means connecting said handlebar to the steering mechanism of the motorcycle, whereby the motorcycle may be steered by movement of said handlebar.

17. The vehicle defined in claim 16, wherein said handlebar is a free handlebar adapted to be supported by the vehicle driver.

18. The vehicle defined in claim 16, wherein said connecting means is a pair of flexible cables, connecting each end of said handlebar to the steering mechanism of the motorcycle.

19. The vehicle defined in claim 16, wherein said connecting means is attached to the handlebars of the motorcycle.

20. The vehicle defined in claim 16, further comprising means connecting said handlebar to the throttle mechanism and brake mechanism of the motorcycle.

21. The vehicle defined in claim 16, further comprising means connecting said handlebar to the clutch mechanism and gear shift mechanism of the motorcycle.

22. A chariot-type vehicle for attachment to a motorcycle comprising, in combination:
 a. a chassis having a frame and a wheel rotatably mounted on each lateral side thereof;
 b. a basket arranged on said chassis, said basket being pivotally connected to said chassis frame on a common central axis, and having drawbar means for attaching itself to a motorcycle;
 c. control means, adapted for connection to a motorcycle, for controlling the steering and speed of the motorcycle from said basket; and
 d. means for selectively preventing pivotal motion of said basket with respect to said chassis, said pivotal motion-preventing means including a two-way ratchet connected to one of said chassis and said basket; a ratched pawl connected to the other of said chassis and said basket; means for biasing said pawl toward said ratchet; and means for selectively withdrawing said pawl from said ratchet, whereby said basket may be pivoted into a horizontal position from any position of lean with said pawl biased toward said ratchet and said pawl will maintain said basket in said horizontal position until withdrawn from said ratchet.

23. A chariot-type vehicle for attachment to a motorcycle comprising, in combination:
 a. a chassis having a frame and a wheel rotatably mounted on each lateral side thereof;
 b. a basket arranged on said chassis, said basket being pivotally connected to said chassis frame on a common central axis, and having drawbar means for attaching itself to a motorcycle; and
 c. control means, adapted for connection to a motorcycle, for controlling the steering and speed of the motorcycle from said basket, said control means including:
 1. a handlebar, adapted to be grasped by a vehicle driver when the driver is in said basket; and
 2. means connecting said handlebar to the handlebars of the motorcycle, whereby the motorcycle may be steered by movement of said handlebar.

* * * * *